(12) United States Patent
Hwang et al.

(10) Patent No.: US 10,716,105 B2
(45) Date of Patent: *Jul. 14, 2020

(54) METHOD FOR TRANSMITTING AND RECEIVING A PHYSICAL DOWNLINK SHARED CHANNEL AND A DEMODULATION REFERENCE SIGNAL AND APPARATUS THEREFOR

(71) Applicant: LG ELECTRONICS INC., Seoul (KR)

(72) Inventors: Daesung Hwang, Seoul (KR); Yunjung Yi, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/065,121

(22) PCT Filed: Feb. 14, 2018

(86) PCT No.: PCT/KR2018/001942
§ 371 (c)(1),
(2) Date: Jun. 21, 2018

(87) PCT Pub. No.: WO2018/151533
PCT Pub. Date: Aug. 23, 2018

(65) Prior Publication Data
US 2019/0334677 A1 Oct. 31, 2019

Related U.S. Application Data

(60) Provisional application No. 62/458,591, filed on Feb. 14, 2017, provisional application No. 62/492,903, (Continued)

(51) Int. Cl.
*H04W 72/04* (2009.01)
*H04W 48/12* (2009.01)
(Continued)

(52) U.S. Cl.
CPC ............. *H04W 72/042* (2013.01); *H04L 1/00* (2013.01); *H04L 5/00* (2013.01); *H04L 5/0051* (2013.01);
(Continued)

(58) Field of Classification Search
None
See application file for complete search history.

(56) References Cited

U.S. PATENT DOCUMENTS 8,842,628 B2    9/2014  Gao et al.
8,873,362 B2   10/2014  Papasakellariou et al.
(Continued)

FOREIGN PATENT DOCUMENTS

KR    1020120018051    2/2012
KR    1020150080605    7/2015
(Continued)

OTHER PUBLICATIONS

Motorola, et al., "DL control channel structure for NR", 3GPP TSG RAN WG1 Meeting #88, R1-1703050, Feb. 2017, 3 pages.
(Continued)

*Primary Examiner* — Gregory B Sefcheck
(74) *Attorney, Agent, or Firm* — Lee, Hong, Degerman, Kang & Waimey

(57) ABSTRACT

A method for receiving a Physical Downlink Shared Channel (PDSCH) in a user equipment (UE) from a base station (BS) in a wireless communication system includes the UE receiving first information related to one or more control resource set (CORESET); receiving second information related to resource region of the PDSCH; receives the
(Continued)

PDSCH based on the second information; and receiving a demodulation reference signal (DMRS) for the PDSCH in an orthogonal frequency divisional multiplexing (OFDM) symbol after the one or more CORESET when the one or more CORESET overlaps the resource region of the PDSCH.

7 Claims, 8 Drawing Sheets

Related U.S. Application Data filed on May 1, 2017, provisional application No. 62/576,583, filed on Oct. 24, 2017.

(51) Int. Cl.
  *H04L 5/00* (2006.01)
  *H04L 1/00* (2006.01)
(52) U.S. Cl.
  CPC ........ *H04W 48/12* (2013.01); *H04W 72/0453* (2013.01)

(56) References Cited

U.S. PATENT DOCUMENTS

| | | | |
|---|---|---|---|
| 8,965,294 | B2 | 2/2015 | Seo et al. |
| 8,971,881 | B2 | 3/2015 | Nimbalker et al. |
| 9,191,945 | B2 | 11/2015 | Seo et al. |
| 9,271,272 | B2 | 2/2016 | Awad et al. |
| 9,397,812 | B2 | 7/2016 | Popovic et al. |
| 9,401,792 | B2 | 7/2016 | Lee et al. |
| 9,461,793 | B2 | 10/2016 | Kim et al. |
| 9,462,582 | B2 | 10/2016 | Feng et al. |
| 9,603,138 | B2 | 3/2017 | Zhao et al. |
| 9,603,141 | B2 | 3/2017 | Chen et al. |
| 9,667,396 | B2 | 5/2017 | Seo et al. |
| 9,769,815 | B2 | 9/2017 | Seo et al. |
| 9,839,020 | B2 | 12/2017 | Seo et al. |
| 9,918,308 | B2 | 3/2018 | Feng et al. |
| 10,015,776 | B2 | 7/2018 | Hosseini et al. |
| 10,200,176 | B2 | 2/2019 | Seo et al. |
| 10,397,854 | B2 | 8/2019 | Baldemair et al. |
| 10,568,086 | B2 * | 2/2020 | Hwang ............... H04W 72/042 |
| 2008/0298477 | A1 | 12/2008 | Classon |
| 2011/0268064 | A1 | 11/2011 | Chen et al. |
| 2013/0064216 | A1 | 3/2013 | Gao et al. |
| 2014/0126490 | A1 | 5/2014 | Chen et al. |
| 2016/0192388 | A1 | 6/2016 | Ekpenyong et al. |
| 2016/0338091 | A1 | 11/2016 | Martin et al. |
| 2017/0026297 | A1 | 1/2017 | Sun et al. |
| 2017/0245271 | A1 | 8/2017 | Lee et al. |
| 2017/0374675 | A1 | 12/2017 | Hwang et al. |
| 2018/0227777 | A1 | 8/2018 | Sun et al. |
| 2018/0234988 | A1 | 8/2018 | Shimezawa et al. |
| 2018/0241525 | A1 | 8/2018 | Ouchi et al. |
| 2019/0149365 | A1 * | 5/2019 | Chatterjee ........... H04L 25/0226 370/329 |
| 2019/0150123 | A1 * | 5/2019 | Nogami .............. H04W 72/042 370/330 |
| 2019/0150124 | A1 * | 5/2019 | Nogami .............. H04W 72/042 370/330 |
| 2019/0158205 | A1 * | 5/2019 | Sheng ................. H04J 11/0076 |
| 2019/0274169 | A1 * | 9/2019 | Tsai .................. H04W 56/0005 |
| 2019/0312621 | A1 * | 10/2019 | Nam .................. H04W 72/042 |
| 2019/0319692 | A1 * | 10/2019 | Noh ..................... H04L 5/0048 |
| 2019/0334677 | A1 * | 10/2019 | Hwang ................ H04L 5/0082 |
| 2019/0379506 | A1 * | 12/2019 | Cheng ................. H04W 80/02 |
| 2020/0022168 | A1 * | 1/2020 | Xu ........................ H04L 5/0053 |
| 2020/0028646 | A1 * | 1/2020 | Seo ........................ H04W 72/04 |
| 2020/0029310 | A1 * | 1/2020 | Lee ....................... H04L 5/0035 |
| 2020/0053758 | A1 * | 2/2020 | Hosseini ................. H04L 5/10 |

FOREIGN PATENT DOCUMENTS

| | | |
|---|---|---|
| KR | 1020150083103 | 7/2015 |
| KR | 1020150117650 | 10/2015 |

OTHER PUBLICATIONS

Qualcomm, "Shortened PDCCH and Data Multiplexing", 3GPP TSG RAN WG1 Meeting #88, R1-1702562, Nov. 2017, 6 pages.
3rd Generation Partnership Project (3GPP), "Technical Specification Group Radio Access Network; Evolved Universal Terrestrial Radio Access (E-UTRA); Radio Resource Control (RRC); Protocol specification (Release 13)," 3GPP TS 36.331 V13.1.0, Mar. 2016, 551 pages.
ZTE, et al., "Discussion on downlink DMRS design", 3GPP TSG RAN WG1 NR Ad-Hoc Meeting, R1-1700135, Jan. 2017, 10 pages.
PCT International Application No. PCT/KR2018/001942, Written Opinion of the International Searching Authority dated May 17, 2018, 10 pages.
CATT, "NR DL control channel structure", 3GPP TSG RAN WG1 Meeting #88, R1-1702092, Feb. 2017, 5 pages.
Nokia, et al., "Dynamic reuse of DL control resources for data in NR", 3GPP TSG RAN WG1 Meeting #88, R1-1703315, Feb. 2017, 6 pages.
NTT Docomo, "Dynamic resource sharing between DL data and control channels", 3GPP TSG RAN WG1 Meeting #88, R1-1702834, Feb. 2017, 8 pages.
Intel, "Physical Downlink Control Channel Design for NR", 3GPP TSG RAN WG1 NR Ad-Hoc Meeting, R1-1700359, Jan. 2017, 6 pages.
Mediatek, "Discussion on NR-PDCCH structure", 3GPP TSG RAN WG1 Meeting #88, R1-1702722, Feb. 2017, 3 pages.
United States Patent and Trademark Office U.S. Appl. No. 16/293,505, Office Action dated May 17, 2019, 13 pages.
United States Patent and Trademark Office U.S. Appl. No. 16/293,505, Notice of Allowance dated Oct. 7, 2019, 12 pages.
European patent application No. 18753836.8, European Partial Search Report dated Jan. 20, 2020, 20 pages.

* cited by examiner (A) CONTROL-PLANE PROTOCOL STACK (B) USER-PLANE PROTOCOL STACK

METHOD FOR TRANSMITTING AND RECEIVING A PHYSICAL DOWNLINK SHARED CHANNEL AND A DEMODULATION REFERENCE SIGNAL AND APPARATUS THEREFOR

CROSS-REFERENCE TO RELATED APPLICATIONS

This application is the National Stage filing under 35 U.S.C. 371 of International Application No. PCT/KR2018/001942, filed on Feb. 14, 2018, which claims the benefit of U.S. Provisional Application No. 62/458,591, filed on Feb. 14, 2017, 62/492,903, filed on May 1, 2017 and 62/576,583, filed on Oct. 24, 2017, the contents of which are all hereby incorporated by reference herein in their entirety.

TECHNICAL FIELD

The present invention relates to a method for transmitting and receiving data in a wireless communication system and an apparatus therefor, and more particularly, to a method for transmitting data by rate matching the data with a control resource set and an apparatus therefor.

BACKGROUND ART

As more communication devices require greater communication traffic in accordance with the trend, a next generation 5G system which is mobile broadband communication more enhanced than the conventional LTE system has been required. In the next generation 5G system referred to as NewRAT, a communication scenario is categorized into Enhanced Mobile BroadBand (eMBB)/Ultra-Reliability and Low-Latency Communication (URLLC)/Massive Machine-Type Communications (mMTC).

In this case, eMBB is a next generation mobile communication scenario having properties such as High Spectrum Efficiency, High User Experienced Data Rate, and High Peak Data Rate, URLLC is a next generation mobile communication scenario (e.g., V2X, Emergency Service, Remote Control) having properties such as Ultra Reliable, Ultra Low Latency, and Ultra High Availability, and mMTC is a next generation mobile communication scenario (e.g., IoT) having properties such as Low Cost, Low Energy, Short Packet, and Massive Connectivity.

Technical Problem

An object of the present invention is to provide a method for transmitting and receiving data in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

According to the embodiment of the present invention, a method for receiving data in a user equipment (UE) from a base station (BS) in a wireless communication system comprises the steps of receiving one or more control resource set (CORESET) regions; receiving rate matching information from a higher layer; and receiving the data based on the one or more CORESET regions and the rate matching information, wherein the data are mapped into at least one CORESET indicated by the higher layer among the one or more CORESETs on the basis of the rate matching information.

At this time, the data may be mapped in accordance with a frequency domain resource of the at least one CORESET.

Also, the rate matching information may include information on resource elements to which a control channel for scheduling the data is transmitted.

Also, the data may not be mapped into the resource elements included in the rate matching information.

Also, if the data are mapped into the at least one CORESET, a DeModulation Reference Signal (DMRS) is mapped into next symbol after the at least one CORESET.

Also, a resource interval into which the data are mapped may be determined based on at least one search space included in the at least one CORESET.

Also, the resource interval into which the data are mapped may be determined based on information on at least one slot included in the at least one CORESET, which is received from the higher layer.

Also, higher layer signaling indicated by the at least one CORESET may be UE-specific higher layer signaling.

If common higher layer signaling is received, the data may be mapped into a specific resource region indicated by the common higher layer signaling on the basis of the rate matching information.

Also, the UE-specific higher layer signaling may be UE-specific dedicated higher layer signaling or UE-group-specific higher layer signaling.

Meanwhile, according to the present invention, a UE for receiving data from an eNB in a wireless communication system comprises an RF module for transmitting and receiving a signal to and from the base station (BS); and a processor connected with the RF module, wherein the processor is configured to receive one or more control resource set (CORESET) regions, receive rate matching information from a higher layer, and receive the data based on the one or more CORESET regions and the rate matching information, wherein the data may be mapped into at least one CORESET indicated by the higher layer among the one or more CORESETs on the basis of the rate matching information.

Also, the rate matching information may include information on resource elements, to which a control channel for scheduling the data is transmitted.

Also, the data may not be mapped into the resource elements included in the rate matching information.

Also, if the data are mapped into the at least one CORESET, a DeModulation Reference Signal (DMRS) is mapped into next symbol after the at least one CORESET.

Also, higher layer signaling indicated by the at least one control resource set may be UE-specific higher layer signaling, and if common higher layer signaling is received, the data may be mapped into a specific resource region indicated by the common higher layer signaling on the basis of the rate matching information.

Also, the UE-specific higher layer signaling may be UE-specific dedicated higher layer signaling or UE-group-specific higher layer signaling.

Advantageous Effects

According to the present invention, resources for a downlink control channel and resources for a downlink data channel may be used efficiently.

It will be appreciated by persons skilled in the art that the effects that can be achieved with the present disclosure are not limited to what has been particularly described hereinabove and other advantages of the present disclosure will be more clearly understood from the following detailed description.

BEST MODE FOR CARRYING OUT THE INVENTION

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

Figure 1:
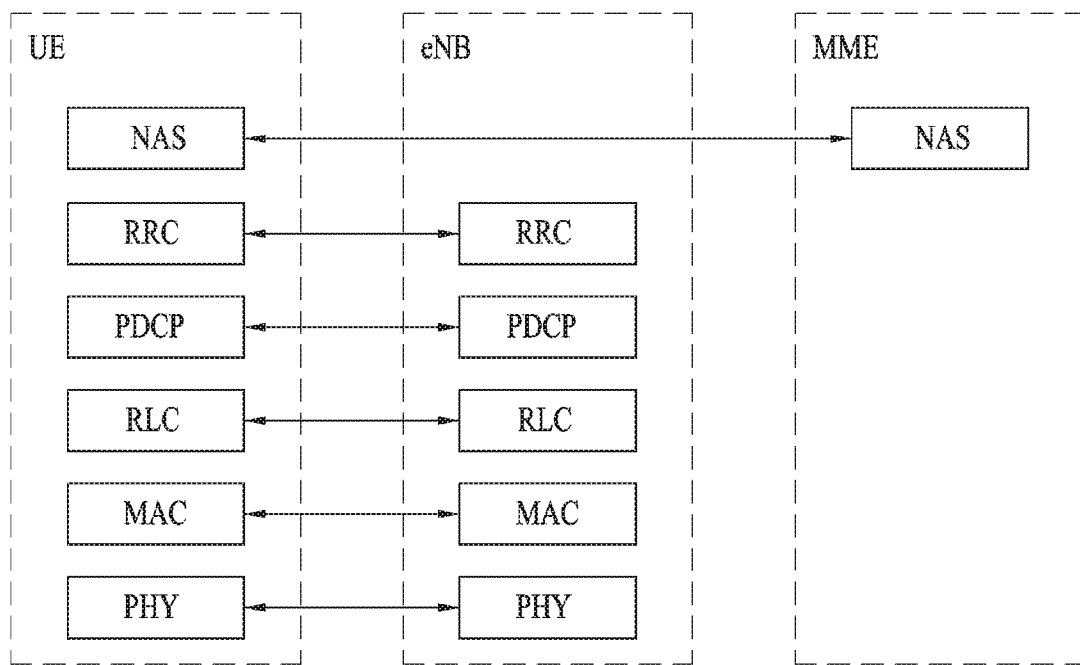
FIG. 1 is a diagram for structures of control and user planes of radio interface protocol between a 3GPP radio access network standard-based user equipment and E-UTRAN.
Figure 1:
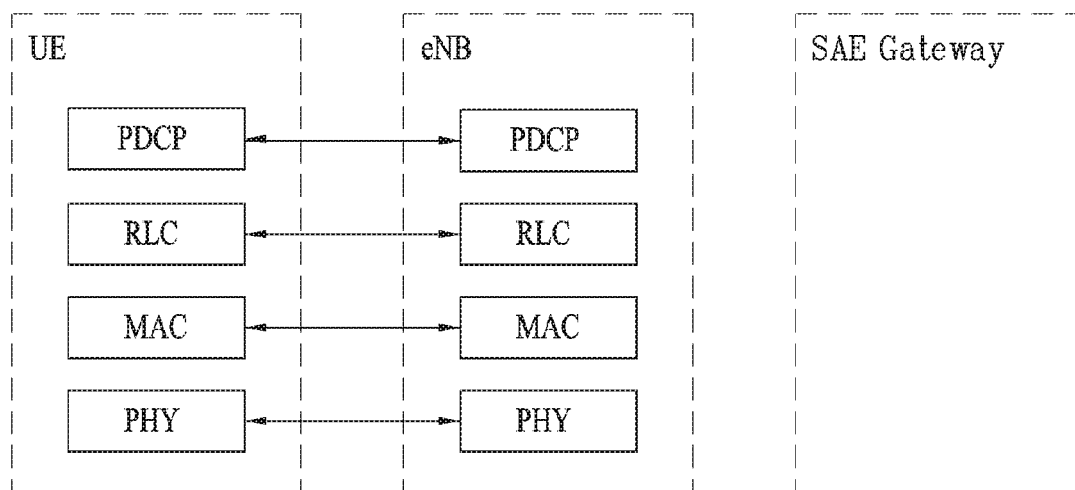

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 2:
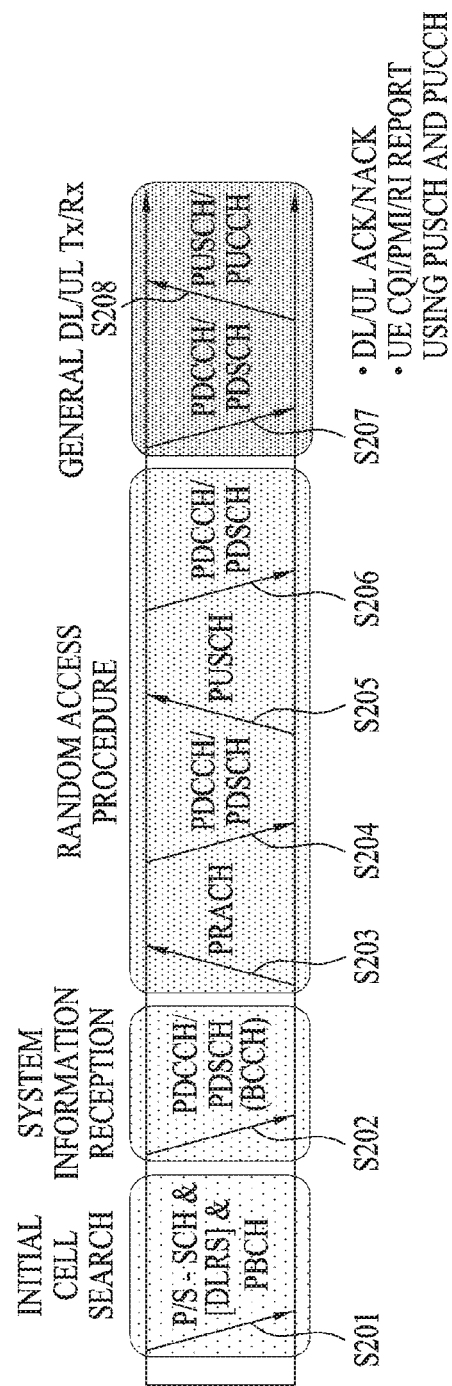
FIG. 2 is a diagram for explaining physical channels used for 3GPP system and a general signal transmission method using the physical channels.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
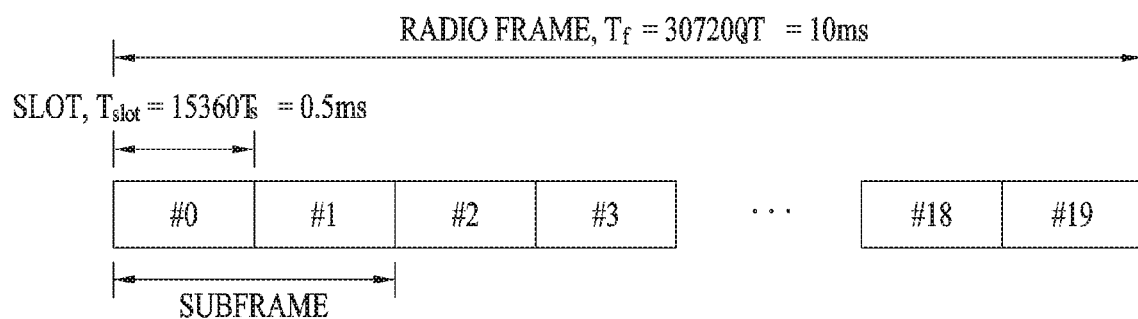
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
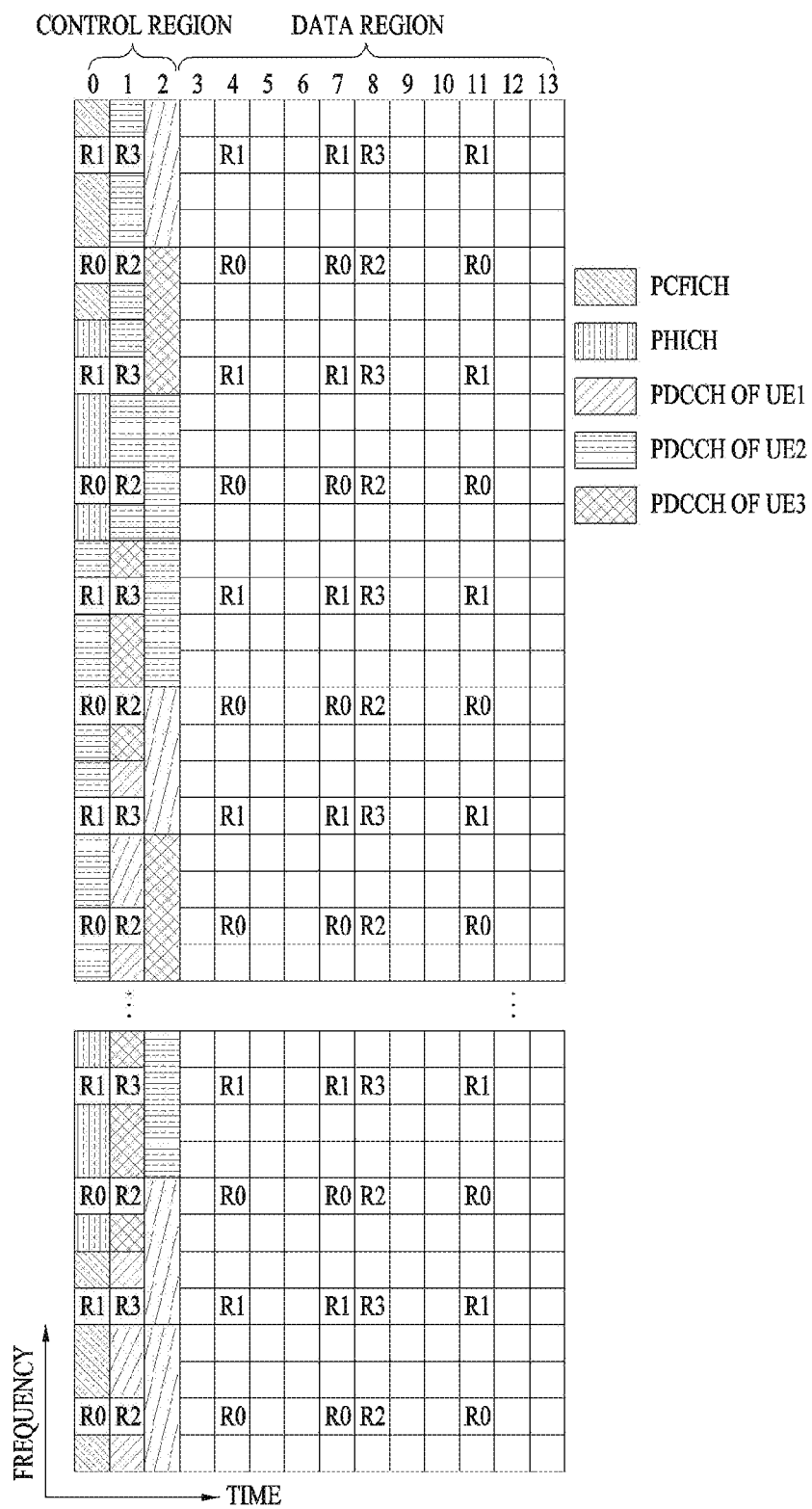
FIG. 4 illustrates a structure of a downlink radio frame in the LTE system.

FIG. 4 illustrates exemplary control channels included in a control region of a subframe in a DL radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 5:
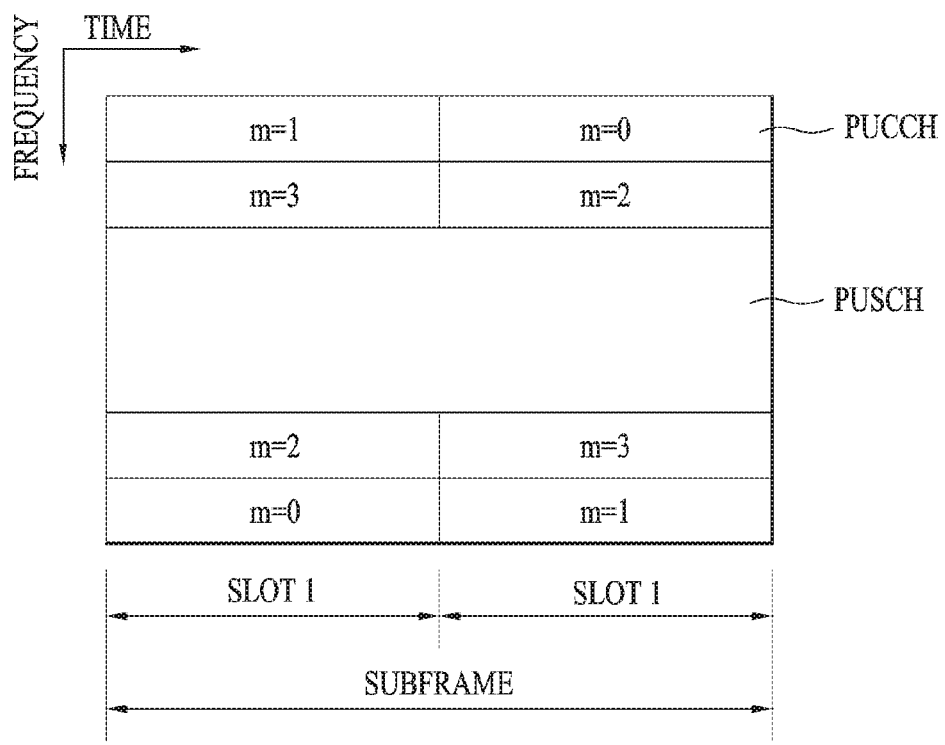
FIG. 5 illustrates a structure of an uplink subframe in the LTE system.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 6:
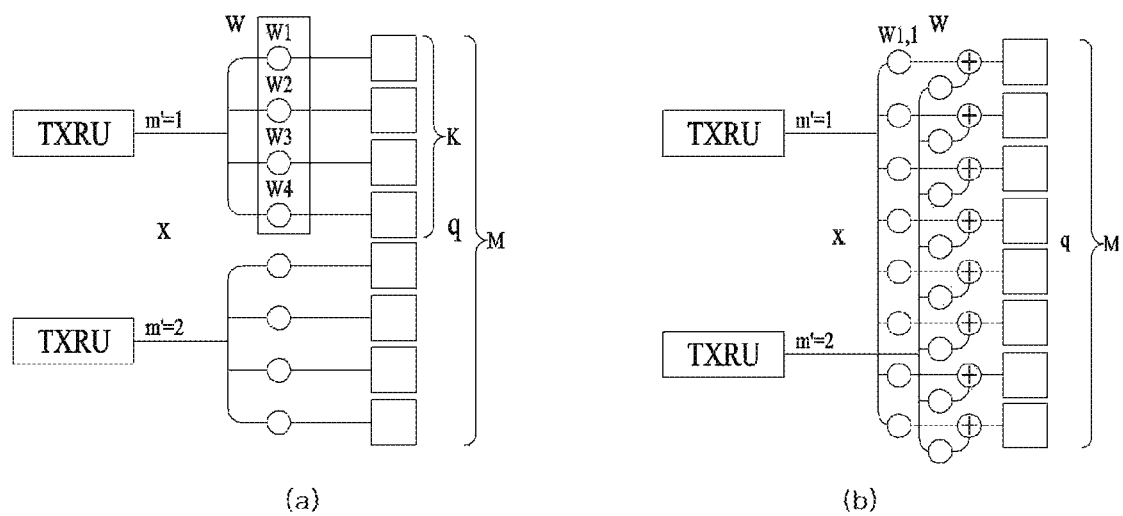
FIG. 6 illustrates examples of a connection scheme between TXRUs and antenna elements.

FIG. 6 illustrates examples of a connection scheme between TXRUs and antenna elements.

Figure 7:
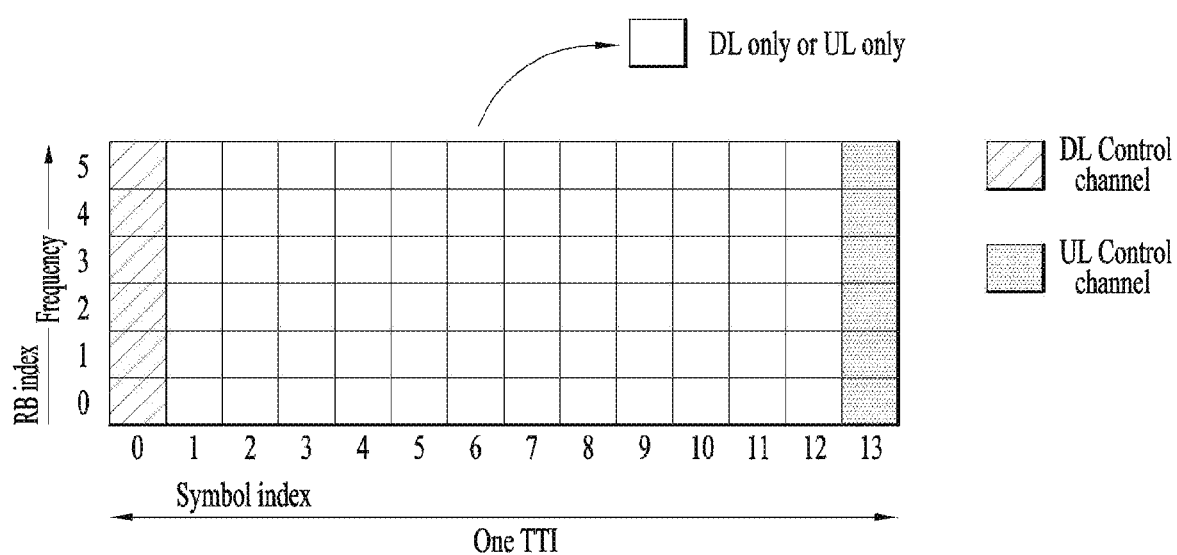
FIG. 7 illustrates an example of a self-contained subframe structure.

(a) of FIG. 6 illustrates that TXRU is connected to a sub-array. In this case, the antenna elements are connected to only one TXRU. Unlike (a) of FIG. 6, (b) of FIG. 6 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

A self-contained subframe structure shown in FIG. 7 is considered in the fifth generation NewRAT to minimize data transmission latency in a TDD system. FIG. 7 illustrates an example of a self-contained subframe structure.

In FIG. 7, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period In the fifth generation NewRAT system, one or more search spaces (SS) may be configured to transmit/detect a downlink control indicator (DCI), and one or more control resource sets (CORESET) may be configured. Also, in the fifth generation NewRAT system, efficient resource sharing between data information and control information may be considered to enhance efficiency in resource use.

Meanwhile, in the fifth generation NewRAT system, a common search space (CSS) and a UE-specific search space (USS) may correspond to the same control resource set. On the other hand, for efficient use of resources, a common search space and a UE-specific search space may be configured to correspond to their respective control resource sets different from each other.

If a control resource set (CORESET) is configured, rate matching may be performed for data transmission considering a region where the control resource set is configured. For example, rate matching may be performed to avoid superposition with the region where the control resource set is configured. However, in case of the control resource set, if superposition and interference among a plurality of PDCCH candidates may be likely to occur, the control resource set may have a big size to reduce blocking among the plurality of PDCCH candidates. In this case, throughput degradation may occur due to reduction of data resources.

Therefore, the present invention suggests a method for efficiently sharing resources between control information and data in accordance with a control resource set, a search space and a relation between control information and data. Meanwhile, although the present invention has been described based on downlink control information, the present invention may extensively be applied to uplink control information.

In data mapping, whether to perform rate matching for a control resource set and how to perform rate matching for a control resource set may be configured per control resource set. In this case, a network may support resource sharing with data for a specific search space such as a UE-specific search space, a downlink search space or an uplink search space or a part of a search space.

As another method, whether to perform rate matching and how to perform rate matching may be configured depending on a type of a search space, that is, a common search space or a UE-specific search space. In detail, rate matching may not be performed for a common search space while data sharing for a UE-specific search space may be more used.

In other words, although PDSCH mapping is not performed for a common search space regardless of the presence of PDCCH in the common search space, PDSCH mapping may be performed for resource elements in the UE-specific search space except PDCCH for scheduling PDSCH.

Next, detailed embodiments for a method for rate matching data for a corresponding region when data mapping is performed for a specific control resource set or a search space will be described.

Embodiment 1-1

When data mapping is performed, rate matching may be performed for all control resource sets or all search spaces.

Embodiment 1-2

When data mapping is performed, rate matching may be performed for only control information corresponding to the data in a control resource set or a search space. In detail, the control information may be control information for scheduling mapped data. Therefore, with respect to control information other than a resource for control information for scheduling data, a gNB may not perform resource allocation for data during data scheduling.

Embodiment 1-3

When data mapping is performed, a resource into which control information for scheduling corresponding data is mapped is assumed as a CCE or PRB at the end of a control region, and then rate matching may be performed. With respect to the other control information, superposition with data may be avoided in such a manner that the other control information may be arranged in separately or transmitted to a resource region.

Embodiment 1-4

Rate matching information on a corresponding control resource set may be transmitted through DCI. For example, information on the first CCE and/or the last CCE, which becomes a target for rate matching, may be transmitted through DCI, or information on the first PRB and/or the last PRB, which becomes a target for rate matching, may be transmitted through DCI.

The DCI may be DCI for scheduling data corresponding to rate matching, or may be group common DCI transmitted through each control resource set. At this time, rate matching of data may be performed in accordance with information indicated through the DCI, whereby data mapping may be performed.

Embodiment 1-5

Rate matching information may be transmitted through group common DCI of a specific control resource set. For example, information on the first CCE and/or the last CCE, which becomes a target for rate matching, may be transmitted through the group common DCI, or information on the first PRB and/or the last PRB, which becomes a target for rate matching, may be transmitted through the group common DCI. Also, rate matching information indicated through the group common DCI may be applied to all control resource sets. And, rate matching of data may be performed in accordance with information indicated through the group common DCI, whereby data mapping may be performed.

Embodiment 1-6

Rate matching information on all or each of control resource sets may be transmitted through higher layer signaling. For example, information on the first CCE and/or the last CCE, which becomes a target for rate matching, may be transmitted through higher layer signaling, or information on the first PRB and/or the last PRB, which becomes a target for rate matching, may be transmitted through higher layer signaling. Also, rate matching of data may be performed in accordance with information indicated through higher layer signaling, whereby data mapping may be performed.

The aforementioned embodiments may independently be applied to each control resource set, and may be configured in combination. For example, 'embodiment 1-6' is applied to a specific control resource set and at the same time 'embodiment 1-2' is applied thereto, whereby rate matching may be performed for control information for scheduling data in addition to the indicated rate matching information.

Also, in a state that a plurality of embodiments are configured, a rate matching method may be changed dynamically using an indication field included in scheduling DCI. Otherwise, the rate matching method may be changed dynamically through RNTI and/or scrambling and/or CRC masking.

Meanwhile, options may be configured for resources for rate matching or puncturing as follows. In the following description, corresponding control information may be control information for scheduling data. Also, in the following description, OFDM symbol may include dynamic or static resources.

(Option 1) It is assumed that data mapping is not performed within a PRB of a PRB group which includes a region into which corresponding control information is mapped.

(Option 2) It is assumed that data mapping is not performed only in an OFDM symbol into which corresponding control information is mapped, within a PRB of a PRB group which includes a region into which corresponding control information is mapped.

(Option 3) It is assumed that data mapping is not performed only in an OFDM symbol into which corresponding control information is mapped, from a first symbol of a control region, within a PRB of a PRB group which includes a region into which corresponding control information is mapped.

(Option 4) It is assumed that data mapping is not performed only in OFDM symbols included in a control region, within a PRB of a PRB group which includes a region into which corresponding control information is mapped.

(Option 5) It is assumed that data mapping is not performed within a PRB which includes a region into which corresponding control information is mapped.

(Option 6) It is assumed that data mapping is not performed only in an OFDM symbol into which corresponding control information is mapped, within a PRB which includes a region into which corresponding control information is mapped.

(Option 7) It is assumed that data mapping is not performed only in an OFDM symbol into which corresponding control information is mapped, from a first symbol of a control region, within a PRB which includes a region into which corresponding control information is mapped.

(Option 8) It is assumed that data mapping is not performed only in OFDM symbols included in a control region, within a PRB which includes a region into which corresponding control information is mapped.

(Option 9) It is assumed that data mapping is not performed in a control resource set which includes a region into which corresponding control information is mapped. In this case, the control resource set may be limited to a resource set which includes a common search space.

However, if a starting point of data mapping is configured at a previous timing of a control region of a control resource set for a common search space, and if superposition with the common search space occurs or control information is detected within the common search space, it is assumed that all of the resource sets may be used for rate matching. If not so, it is assumed that the resource set is used for only data mapping.

That is, if control information is detected within the common search space, it may be assumed that the resource set is a control resource set and data may be rate matched within the control resource set. On the other hand, if control information is not detected, it is assumed that the resource set is not a control resource set and is only a resource set used for data mapping.

Meanwhile, a plurality of search spaces may be configured for the same control resource set. That is, the common search space and the UE-specific search space may equally be configured for a specific control resource set. In this case, a data rate matching method may be configured differently even within the same control resource set.

For example, in case of a sub-region corresponding to the common search space, rate matching may be performed for all control resource sets or search spaces, or rate matching may be performed in accordance with a rate matching region indicated through DCI or higher layer signaling.

On the other hand, in case of a sub-region corresponding to the UE-specific search space, when data mapping is performed, rate matching may be performed only for control information corresponding to the mapped data within the control resource set or the search space, or rate matching may be performed in accordance with rate matching region indicated through DCI or higher layer signaling. In this case, the UE-specific search space may be a specific UE-dedicated search space or a search space for a specific UE group.

At this time, the indicated rate matching region may be configured independently for each of the common search space and the UE-specific search space. This is because that a rate matching method through scheduling may not be easy due to small PDCCH candidates for the common search space. Furthermore, in a state that a plurality of methods are configured, the rate matching method may be changed dynamically using an indication field within scheduling DCI.

All or some of the control resource sets may be UE-specific, or may be designated UE-group commonly. At this time, notification of the network to a specific UE with respect to information on all control resource sets may be inefficient in view of signaling overhead. Therefore, separate rate matching may not be performed for the other control resource sets except the control resource set configured for the specific UE or the UE group common, and collision of resource allocation between control information and data may be avoided based on scheduling.

Figure 8:
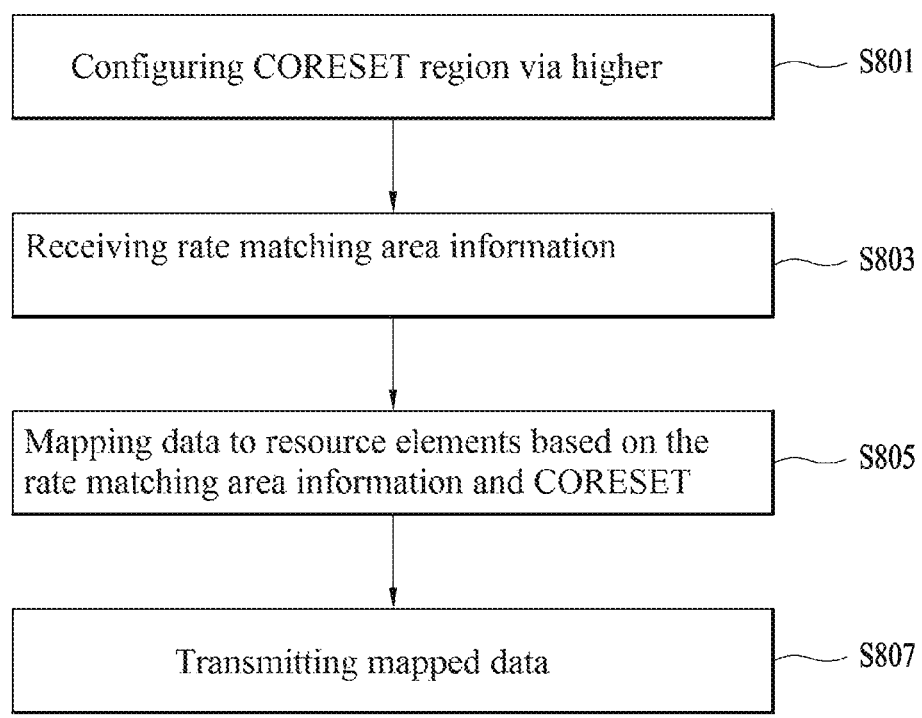
FIG. 8 is a diagram illustrating a method for transmitting data in accordance with one embodiment of the present invention.

The aforementioned description will be summarized briefly based on FIG. 8. A region for a control resource set is configured through a higher layer (S801), and rate matching information is received through DCI or higher layer signaling (S803). At this time, S803 may be performed in accordance with the aforementioned embodiments 1-4 to 1-6, and may be omitted in accordance with the embodiments 1-1 to 1-3.

Afterwards, data are mapped into their respective resource elements on the basis of the control resource set and the rate matching information (S805), and the mapped data are transmitted (S807).

Meanwhile, in the fifth NewRAT system, a single PDCCH or a plurality of PDCCHs for a PUSCH may be transmitted. Particularly, although a transport format of the PDCCH may be a localized format, it may be a distributed format for acquisition of frequency diversity. Next, embodiments of a rate matching method for a plurality of PDCCHs will be described. Particularly, in the following embodiments, rate matching methods for scheduling DCI will be described in detail.

Embodiment 2-1

It is assumed that all CCEs included between the first CCE and the last CCE, that is, all CCEs included between the first CCE and the last CCE, into which the detected scheduling DCI is mapped, may be rate matched. In this case, other control information except the scheduling DCI may be transmitted through a middle CCE arranged between the first CCE and the last CCE.

Embodiment 2-2

Rate matching may be performed for CCEs into which a plurality of DCIs are mapped. This method may be favorable in view of efficiency of resources.

Embodiment 2-3

If scheduling information is enabled to be transmitted through a plurality of PDCCHs, it may be assumed that entire control resource sets are used for rate matching.

Meanwhile, resource elements which are rate matched may be indicated, whereby the embodiments 2-1 to 2-3 may be applied to even an indication based rate matching method for performing rate matching based on the indicated resource elements. In this case, information on a main PDCCH may be indicated, whereby the embodiments 2-1 to 2-3 may be applied based on the main PDCCH. For example, in the embodiment 2-1, the first CCE may be regarded as the first CCE of the main PDCCH, whereby rate matching may be performed based on the first CCE of the main PDCCH.

Meanwhile, in supporting mapping of data into a control resource region, the rate matching method may be varied depending on whether mapping of control information is localized or distributive. At this time, the mapping method may mean mapping of REG into CCE and/or mapping of CCE into PDCCH.

For example, if control information is distributively mapped into a frequency domain region, since resource sharing with data may not be easy, rate matching may be performed for the entire control resource sets. If the control information is locally mapped in the frequency domain region, since FDM between data and control information may be easy, in the same manner as the aforementioned options 1 to 6, rate matching may be performed based on configuration or rate matching may be performed for only a resource corresponding to control information of the corresponding UE.

As another method, a mapping scheme of the control information may include a time first mapping scheme and a frequency first mapping scheme. In the time first mapping scheme, rate matching may be performed based on configuration in the same manner as the aforementioned options 1 to 6, or rate matching may be performed for only a resource corresponding to the control information of the corresponding UE.

On the other hand, in the frequency first mapping scheme, rate matching may be performed for the entire control resource sets, or rate matching may be performed based on configuration in the same manner as the aforementioned options 1 to 6.

Also, in the fifth generation NewRAT system, a numerology may be varied between data and control information. Alternatively, different numerologies and/or TTI types may be used between combinations of a plurality of kinds of control information and data. In this case, it may not be suitable that rate matching of data is performed for a part of the control resource set within the control resource sets.

Therefore, in the above case, rate matching of data may be performed for the entire control resource sets. Meanwhile, a resource partially superposed on a resource into which control information is mapped may be rate matched in accordance with rate matching information which is indicated explicitly or implicitly. Also, the information on rate matching may independently be configured per numerology and/or TTI type.

At this time, the numerology may be a numerology for control information or a numerology for data. Also, the information on rate matching may be configured per numerology between control information and/or data and/or TTI type combination.

For example, a rate matching method performed for data assuming a first numerology in a control region assuming a second numerology may be different from a rate matching method performed in a control region assuming a first numerology.

That is, a rate matching method in a control region assuming the same numerology as that of data may be different from a rate matching method in a control region assuming a numerology different from that of data.

As an example of an explicit rate matching method according to the aforementioned method, a rate matching method may be configured through RRC, or a rate matching method may be indicated through scheduling DCI. If a rate matching method for a plurality of numerologies is configured or indicated, the rate matching method may have an indication field existing for a numerology for control information or data or combination thereof.

Unlike the aforementioned method, data transmitted within the control resource set may be transmitted by being converted to the same numerology as that of control information.

As described above, if the numerology of data is different from that of control information, a starting point of a PDSCH may be configured, and if the starting point of the PDSCH includes a control region, even if monitoring is configured for the corresponding control region, the control information may not be monitored. At this time, the aforementioned configuration may be limited to the case that numerology of data is different from that of control information. Meanwhile, unlike the aforementioned embodiments, if the starting point of the PDSCH is smaller than ODFM symbol index into which control information of the UE which receives the PDSCH, it is assumed that rate matching has been performed for symbols into which the control information is mapped, that is, all control resource sets.

Meanwhile, in scheduling PDSCH or PUSCH, a multi-slot aggregation may be considered. At this time, it may be assumed that the first TTI type and the second TTI type are different from each other, and a relative length of the second TTI type is shorter than the first TTI type. In this case, a control resource set may be configured for each slot, and at this time, the rate matching method may be as follows.

The PDSCH starting point per slot may be configured semi-statically or dynamically. At this time, the dynamic configuration may indicate a PDSCH starting point of a first DCI of the slot-aggregation, or may indicate corresponding rate matching or puncturing information per slot. Also, considering encoding time, puncturing may be performed for PDSCH transmission within the control resource set of the other slot except the first slot.

Otherwise, rate matching information may explicitly be indicated per slot, and the UE may perform rate matching or puncturing based on the corresponding information. Meanwhile, as described above, the case that rate matching information is explicitly indicated may explicitly indicate the case that rate matching should be performed for other reason as well as the case that control information is rate matched in the same manner as the case that information on CSI-RS is indicated. Alternatively, a starting point and the last point of each slot may be indicated per slot semi-statically or dynamically.

Meanwhile, considering control information signaling overhead, rate matching or puncturing information may be applied to a plurality of slots. For example, in the aforementioned example, information on a starting point and/or the last point of a slot for which data mapping is available may be applied to the plurality of slots.

In detail, considering signaling overhead, rate matching information on a plurality of slots/slot groups may be provided, and a rate matching pattern for the first slot may be applied equally. For example, it may be assumed that CSI-RS rate matching is equally applied to a plurality of slots/slot groups.

As another method, different rate matching configuration may be applied to the first slot and the other slots among the plurality of slots. For example, the first slot may perform rate matching for control information on a specific UE, and the other slots may perform rate matching for entire control resource sets or perform puncturing.

Meanwhile, in the multi-slot, it may basically be efficient that time-frequency resources are always indicated at the same time.

Also, a method for rate matching or puncturing described in the embodiment of the present invention may be applied to UL transmission for transmitting CSI-RS, UCI, PDSCH mapping information as well as PDCCH and DL transmission for transmitting PUSCH mapping information during PDSCH or PUSCH mapping. Also, the contents indicated to the UE by the eNB are only exemplary, and it will be apparent that the spirits of the present invention may extensively be applied to an opposite case, that is, the method indicated to the eNB by the UE.

Also, if is required that another PDCCH should be transmitted from a middle slot after PDSCH or PUSCH is scheduled for a multi-slot, or it is required that another PDCCH should be transmitted from a specific mini-slot within a single slot after PDSCH or PUSCH is scheduled for the single slot, PDCCH required to be transmitted at the middle slot may be transmitted in the form of pre-emption or superposition of already assigned downlink resources. In this case, an indication signal for a pre-empted resource may be transmitted from the eNB to the UE.

Meanwhile, if a data transmission duration is relatively small in the same manner as the case that the number of symbols for data transmission is small, a resource sharing method between PDCCH and PDSCH according to the present invention may particularly be useful. However, even in case of resource sharing between PDCCH and PDSCH according to the present invention, since DMRS should not be rate matched for demodulation and decoding of PDSCH, it is required that a position to which DMRS is transmitted should be defined separately.

Hereinafter, embodiments for a method for configuring a position to which DMRS is transmitted will be described.

Meanwhile, prior to description of a method for configuring a position to which the DMRS is transmitted, cases for resource arrangement for PDCCH and PDSCH will be described.

Case 1

A case that resources for PDCCH and PDSCH are not superposed, that is, a case that a PDCCH and a PDSCH are fully subjected to FDM.

Case 2

If resources for PDCCH and PDSCH are partially superposed on a frequency axis, some frequency region for the superposed PDSCH, that is, RB region may be subjected to TDM with the PDCCH.

For example, if a wideband RS is used for the PDCCH, and if a subset of CORESET to which the PDCCH is transmitted and a resource for the PDSCH are partially superposed on the frequency axis, the frequency region for the partially superposed PDSCH may be subjected to TDM with the subset of CORESET.

At this time, in a segment for the subset of CORESET, the segment may be comprised of continuous RBs, and the same precoding and/or channel estimation may be assumed in the corresponding segment region.

Case 3

If resources for PDCCH and PDSCH are fully overlapped on a frequency axis, entire scheduled frequency resource regions for the PDSCH may be subjected to TDM with the PDCCH. Meanwhile, the case 3 may include that the frequency resource region for the PDCCH is greater than the frequency resource region for the PDSCH.

For example, if a wideband RS is used for the PDCCH, and if a subset of CORESET to which the PDCCH is transmitted and a resource for the PDSCH are fully overlapped on the frequency axis, the subset of CORESET and the entire frequency region for the PDSCH may be subjected to TDM. At this time, in a segment for the subset of CORESET, the segment may be comprised of continuous RBs, and the same precoding and/or channel estimation may be assumed in the corresponding segment region.

Meanwhile, the region for the PDCCH may include a region corresponding to a rate matching pattern. Also, the region for the PDCCH may include a region into which RS corresponding to the PDCCH is mapped.

Now, the embodiments for a method for configuring a position to which DMRS is transmitted will be described.

Basically, it may be favorable that the position of the DMRS is prior to a mapping position of data when considering a processing time.

If data symbol indexes for PDSCH/PUSCH are indicated by scheduling DCI, the DMRS may be mapped into the indicated symbol or a previous symbol of the indicated symbol. On the other hand, if scheduling DCI does not indicate the first symbol index for PDSCH/PUSCH, the DMRS may be mapped into next symbol after the last symbol of CORESET for scheduling DCI or next symbol of the starting or last symbol of the PDCCH which includes scheduling DCI. Meanwhile, in case of PUSCH, the DMRS may be mapped after offset predefined or configured by higher layer signaling. In other words, the DMRS may be mapped from the symbol after the offset interval from the starting or last symbol of PDCCH which includes scheduling DCI. Meanwhile, the first symbol of corresponding TTI or the first symbol after CORESET may be indicated through higher layer signaling, and the DMRS may be mapped based on the first symbol.

Meanwhile, the aforementioned DMRS mapping may be expressed explicitly in the case 1 or the case 3. In the same manner as the case 2, if the first symbol index for the PDSCH is different per RB or frequency resource, additional task may be required.

For example, in the same manner as the case 2, if resources for PDSCH and PDCCH are partially superposed on the frequency axis, the position to which the DMRS is transmitted may be arranged in the same manner as the following embodiment.

Embodiment 3-1

A symbol index for transmitting the DMRS is set to a maximum value of the first symbol index per RB or frequency resource of the corresponding PDSCH. For example, if a first symbol index in a specific frequency region is 1 and a first symbol index in the other frequency region is 2, the DMRS may be mapped into a symbol having index number 2.

Embodiment 3-2

A symbol index into which DMRS is mapped may be different per RB or frequency resource of the corresponding PDSCH. That is, the DMRS is transmitted at the first symbol index for each frequency resource. Meanwhile, the frequency resource may be determined in a unit of RE, RB, or RBG.

Embodiment 3-3

The DMRS is transmitted only in a region not overlapped with PDCCH, CORESET or rate matching resources (RMR) on the frequency axis. In this case, channel estimation for a resource overlapped with PDCCH or CORESET on the frequency axis may be acquired through DMRS sharing between PDCCH and PDSCH.

At this time, the first symbol index for the PDSCH may be determined in accordance with a rate matching resource. Also, the frequency resource may be determined in a unit of RBG for corresponding PDSCH/PUSCH considering mapping for PDSCH/PUSCH, or may be determined in a unit of REG or REG bundle considering mapping for PDCCH. Also, considering channel estimation unit, the frequency resource may be determined in a unit of PRB bundle. That is, a mapping unit for the DMRS may be determined in accordance with the frequency resource unit.

Figure 9:
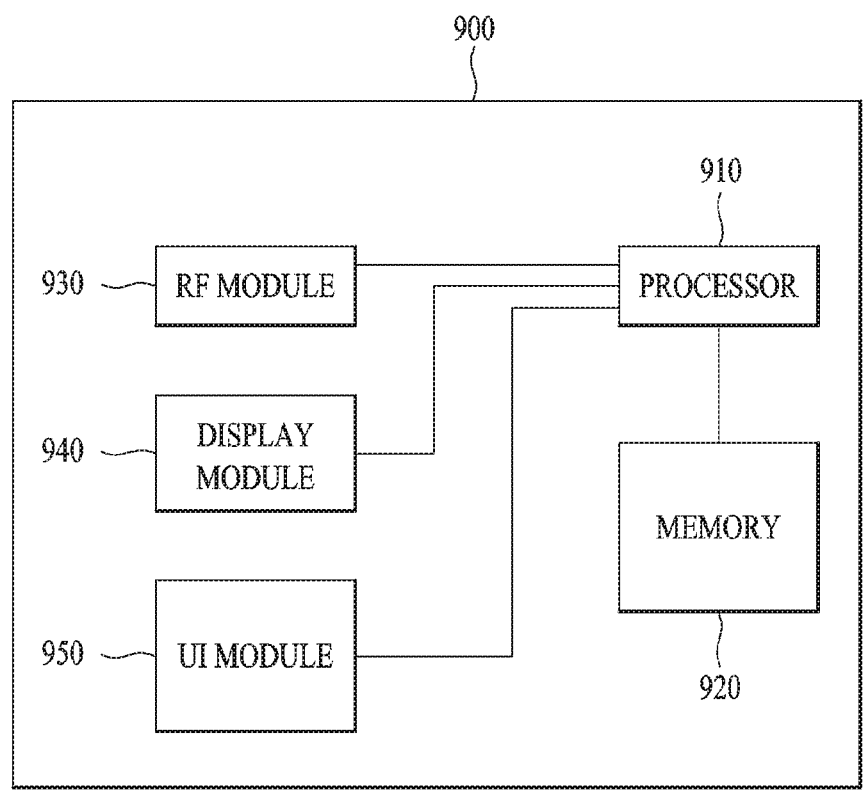
FIG. 9 is a block diagram of a communication apparatus according to one embodiment of the present disclosure.

Referring to FIG. 9, a communication apparatus 900 includes a processor 910, a memory 920, an RF module 930, a display module 940, and a User Interface (UI) module 950.

The communication apparatus 900 is shown as having the configuration illustrated in FIG. 9, for the convenience of description. Some modules may be added to or omitted from the communication apparatus 900. In addition, a module of the communication apparatus 900 may be divided into more modules. The processor 910 is configured to perform operations according to the embodiments of the present disclosure described before with reference to the drawings. Specifically, for detailed operations of the processor 910, the descriptions of FIGS. 1 to 8 may be referred to.

The memory 920 is connected to the processor 910 and stores an Operating System (OS), applications, program codes, data, etc. The RF module 930, which is connected to the processor 910, upconverts a baseband signal to an RF signal or downconverts an RF signal to a baseband signal. For this purpose, the RF module 930 performs digital-to-analog conversion, amplification, filtering, and frequency upconversion or performs these processes reversely. The display module 940 is connected to the processor 910 and displays various types of information. The display module 940 may be configured as, not limited to, a known component such as a Liquid Crystal Display (LCD), a Light Emitting Diode (LED) display, and an Organic Light Emitting Diode (OLED) display. The UI module 950 is connected to the processor 910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the aforementioned method for indicating preempted resource information in a wireless communication system and the apparatus therefor have been described based on the 5th generation NewRAT system, the method and the apparatus may be applied to various mobile communication systems.

What is claimed is:
1. A method for receiving a Physical Downlink Shared Channel (PDSCH) in a user equipment (UE) from a base station (BS) in a wireless communication system, the method comprising:
  receiving first information related to one or more control resource set (CORESET);
  receiving second information related to a resource region of the PDSCH;
  receiving, the PDSCH based on the second information; and receiving a demodulation reference signal (DMRS) for the PDSCH in an orthogonal frequency divisional multiplexing (OFDM) symbol after the one or more CORESET when the one or more CORESET overlaps the resource region of the PDSCH.

2. The method according to claim 1, wherein the PDSCH is mapped based on a frequency domain resource of the one or more CORESET.

3. The method according to claim 1, wherein the PDSCH is not received in a resource block (RB) and an OFDM symbol including the one or more CORESET.

4. The method according to claim 1, wherein the PDSCH is not received in a resource for a specific search space.

5. A UE for receiving a Physical Downlink Shared Channel (PDSCH) from a base station (BS) in a wireless communication system, the UE comprising:
   at least one transceiver;
   at least one processor; and
   at least one computer memory operably connectable to the at least one processor and storing instructions that, when executed, cause the at least one processor to perform operations comprising:
   receiving first information related to one or more control resource set (CORESET);
   receiving second information related to resource region of the PDSCH;
   receiving the PDSCH based on the second information; and
   receiving a demodulation reference signal (DMRS) for the PDSCH in an orthogonal frequency divisional multiplexing (OFDM) symbol after the one or more CORESET when the one or more CORESET overlaps the resource region of the PDSCH.

6. The UE according to claim 5, wherein the PDSCH is not received in a resource block (RB) and an OFDM symbol including the one or more CORESET.

7. The UE according to claim 5, wherein the PDSCH is not received in a resource for a specific search space.

* * * * *